May 23, 1933. R. C. ELLIS 1,910,098
AIRPLANE
Filed Jan. 30, 1932 2 Sheets-Sheet 1
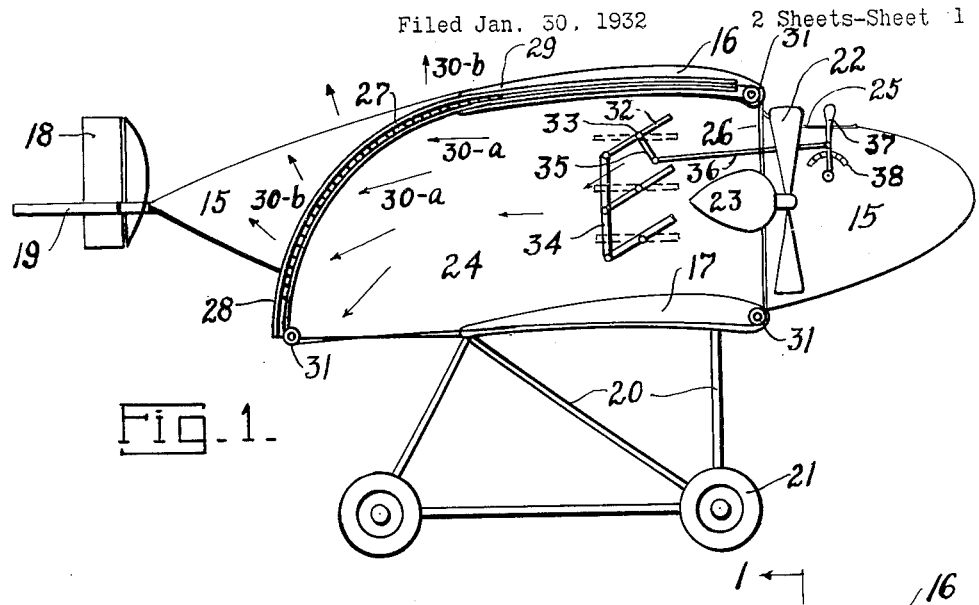
Fig. 1.
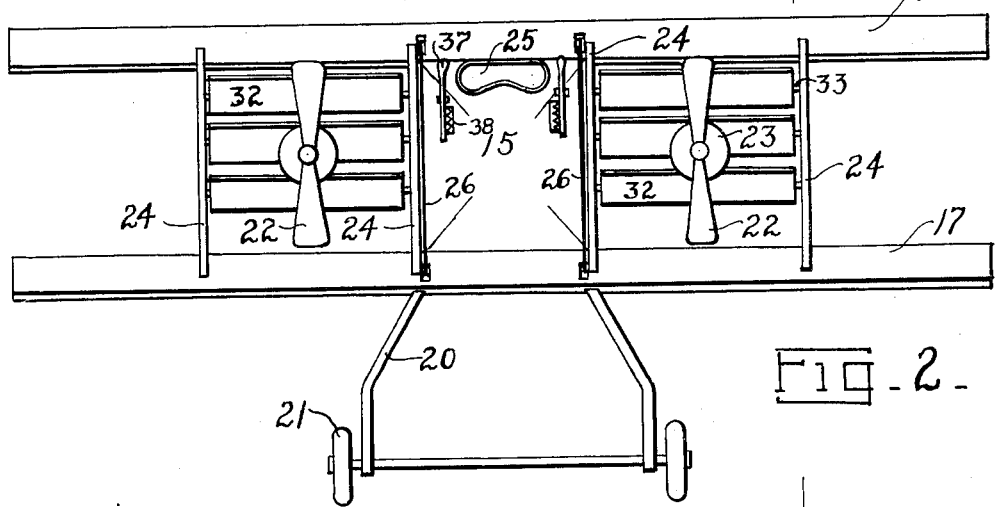
Fig. 2.
Fig. 3. Fig. 4.
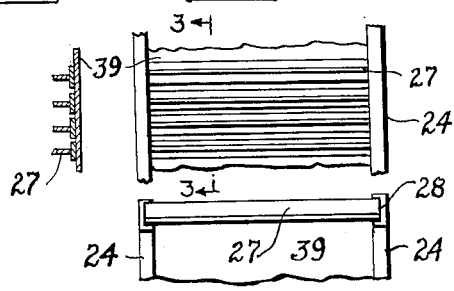
Fig. 5.
INVENTOR
Robert C. Ellis May 23, 1933.  R. C. ELLIS  1,910,098
AIRPLANE
Filed Jan. 30, 1932   2 Sheets-Sheet 2

INVENTOR
Robert C. Ellis

Patented May 23, 1933

1,910,098

UNITED STATES PATENT OFFICE

ROBERT C. ELLIS, OF BRONX, NEW YORK

AIRPLANE

Application filed January 30, 1932. Serial No. 589,877.

This invention relates to airplanes and is designed as an improvement over the conventional type of airplanes which at the present time are required to alight on and take off from a large landing field owing to the great speed required of the present type airplane in order to keep aloft.

The principal object of this invention is to provide an airplane which can "take off" directly from the ground or at greatly reduced speed and which can also land from a flight with very little or no forward motion with-out endangering the safety of the occupants or the plane itself.

A further object of the invention is to provide an airplane in which the propeller, giving forward thrust or pull to the airplane, is also utilized, as occasion may arise, to give an upward lift through the use of adjustable auxiliary planes located within the air stream.

A still further object of the invention is to provide an airplane in which the propeller is so placed as to cause practically its entire air stream to flow into a restricted or confined passage in which are located the adjustable auxiliary lifting planes.

A still further object of the invention is to provide suitable means by which air is propelled laterally against adjustable planes so as to deflect the air stream downwards, thereby causing a sufficient lifting moment for the entire airplane to rise or land directly from or to the ground, thereby also permitting safe landing during fog or in darkness.

These and other objects are accomplished by providing a construction and an arrangement of the various parts in the manner hereinafter described and particularly pointed out in the appended claims.

In the drawings;

Fig. 1 is a cross sectional side view on the line 1—1 of Fig. 2.

Fig. 2 is a front view of the airplane.

Fig. 3 is an enlarged sectional view of a portion of the adjustable lifting plane mechanism.

Fig. 4 is a front view of a part of this particular plane mechanism.

Fig. 5 is an end view of part of this plane mechanism.

Figure 6:
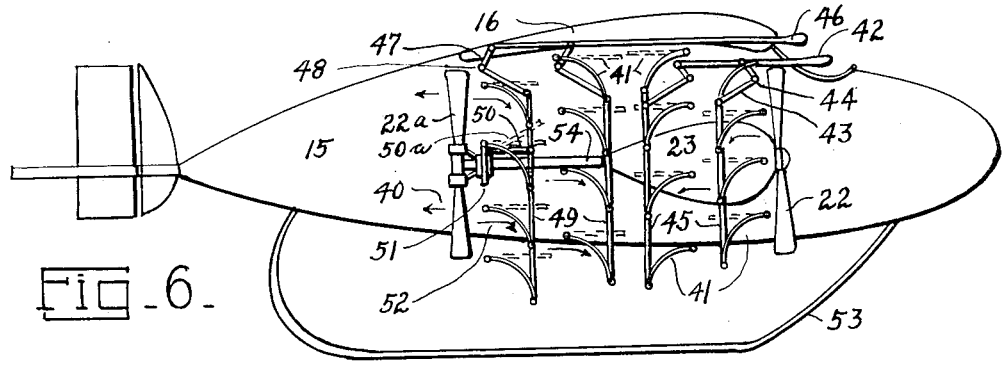
Fig. 6 is a side view of a different arrangement for accomplishing the same result as shown in previous views.

Referring to the drawings in which like numerals of reference refer to similar parts throughout the several views, 15 indicates the fuselage of the airplane with the upper and lower wings 16 and 17 respectively mounted thereto. The usual lateral and vertical rudders are indicated by the numerals 18 and 19 respectively. The landing gear is indicated by 20 and the wheels by 21. In my particular type airplane it will be preferable to so place the propeller that its maximum amount of air stream can be efficiently utilized against the adjustable lifting planes and for this reason I mount the propeller 22 in close proximity to both the upper and lower planes 16 and 17 as shown so as to more effectively confine the air stream. The propeller is revolved by the motor 23.

In operation, the propellers 22 are revolved causing a very strong air stream confined between the upper and lower planes and by the partitions 24. In regular flight, the airplane is pulled forward in the usual manner, the planes 16 and 17 deflecting the air and causing the airplane to sustain itself only while in rapid motion. However, should the operator of the airplane, who occupies seat 25, desire to slow down or stop in midair without danger of descending, all that is necessary for him to do is to pull rope 26 upward which action will cause the adjustable plane 27 to slide downwards, in the manner of a roll top desk, within the slots 28 located at the ends of the partitions 24. The rope 26 is attached to the upper end of this adjustable plane at 29. Referring more particularly to Fig. 1, it will be noticed that the airstream produced by the propeller 22 will be now deflected by the auxiliary plane 27 as indicated by the arrows 30—a and the resultant upward motion imparted to the airplane will be in a direction as shown by the arrows 30—b. It will be noticed that the partitions 24 extend rearwardly a sufficient distance behind the rear of the lower plane 17 so as to confine the air current for better effect on the lifting plane 27. The slot 28 extends within almost the entire width of the upper plane 16 and the lifting plane 27 can thus be drawn into the interior of plane 16 when the operator from his seat 25 pulls downward on the rope 26 which travels over the pulleys 31, this position being necessary when rapid forward flight is desired.

In the drawings, I have shown two motors and propellers but it will be understood that any number of these units may be employed. In addition or in substitution of the plane 27 I mount at a suitable place within the airstream a number of superimposed auxiliary planes 32 capable of lateral inclination on their pivots 33. These superimposed planes are pivotally attached to each other by means of the rocker-arm 34. A level 35, attached to the upper auxiliary plane 32 is pivoted to the rod 36 which in turn is pivoted to the operating handle 37 adjacent to the operators seat 25. The lever 37 is held in its adjusted position by means of the serrations 38.

In operation, it will be evident that the auxiliary planes 32 can be used either to give direct lifting effort to the plane, to give longitudinal stabilty and, when two or more sets are arranged laterally, to give lateral stabilty. By increasing the number and area of these lifting planes 32, and preferably mounting them in close proximity to the propellers 22, they may substitute entirely for the lifting plane 27 and also eliminate the partitions 24. A canvas or other flexible sheet 39 secures the individual deflecting planes together.

Referring now more particularly to Fig. 6, it will be noticed that I have shown an additional propeller 22a mounted on the rear end of the motor shaft 54. In ordinary flight, this propeller impels an airstream in the direction indicated by the arrows 40, this assisting the forward propeller 22 and driving the airplane forward. Interposed between these two propellers are a series of laterally mounted lifting planes 41, their regular flight position being indicated by the dotted lines. When it is desired to rise from the ground directly upwards, the operator starts the motor and pushes rearwardly on the handle 42, this action causing the bell crank levers 43, which are pivoted at 44, to lower the vertical rods 45 to which in turn are secured one end of the flexible deflecting planes 41, causing them to form a more efficient concave deflecting surface against the air stream. At the same moment, the operator will pull the handle 46 which operates the bell crank lever 47, pivoted at 48, causing the vertical rods 49 to lower with the same result to the particular deflecting planes attached thereto as with the operating handle 42, with the exception that the planes 41 are so mounted as to have their concave sides toward the rear. Attached to the vertical rod 49 is the lever 50 which operates in such a manner as to cause the blades of the propeller 22a, through means of clutch 51, to change their pitch in the reverse direction, thereby causing the air-stream to be altered from the direction indicated by the arrows 40 to that of the arrows 52. It will now be evident that both propellers are impelling an air-stream in opposite directions, in this particular case, against each other, thus equalizing any longitudinal thrust. However, as the deflecting planes 41 are suitably interposed in the air-streams of both propellers, the airstreams will be deflected by the deflecting planes and the reaction will cause the airplane to rise directly upward from the ground. After a sufficient height has been reached and the pilot desires to proceed forwardly to his destination, he pulls forwardly on the handle 42 and rearwardly on the handle 46, this action restoring the deflecting planes 41 to their original horizontal position and offering negligible resistance to the rapid forward travel of the airplane, the aforementioned action incidentally reversing the pitch of the propeller 22a, the operating rod 50 then assuming a position as shown by the dotted line 50a. With the use of my plane it is not necessary to provide the usual landing wheels 21 as no running start or stop will be required as will be readily understood from the foregoing description and for this reason I substitute a pair of resilient landing supports 53. The reversing pitch mechanism 51 may be a reversing gear instead and controlled by the same operating mechanism herein described, thus simply reversing the direction of rotation of the propeller, with the same result.

Figure 7:
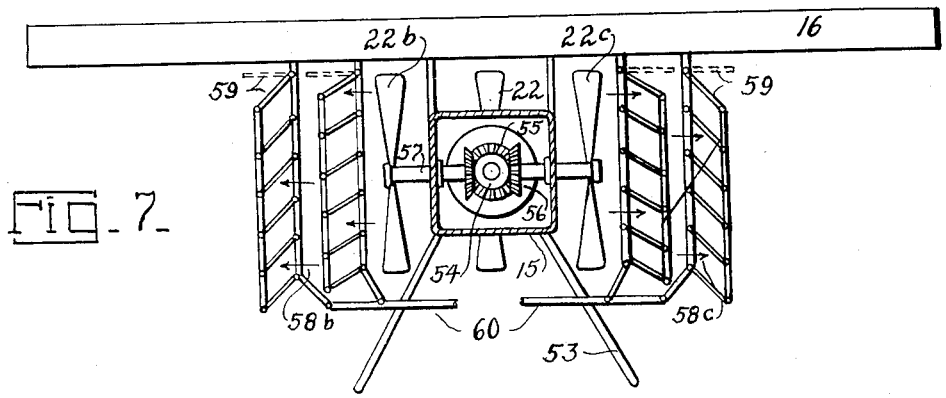
Fig. 7 shows a rear sectional view of a still different arrangement.

In Fig. 7 is shown a rear view of an airplane arrangement in which the propeller 22 is shown mounted on the forward end of the fuselage, the shaft 54 of the motor extending within the fuselage as shown. To this shaft is attached a bevel gear 55 with which are meshed two other bevel gears 56 operating the shafts 57 to which are mounted propellers 22b and 22c each impelling air outwardly in the direction of 58b and 58c. Mounted in close proximity in the air-stream created by these propellers are deflectors 59, the position of the upper one being shown by the dotted lines when in neutral or forward flight position. These deflectors are operated by the rods 60 from the pilot seat in the same manner as described in the plane illustrated in Fig. 6. It will be noticed that the air-streams created by the propellers 22b and 22c in the plane shown in Fig. 7 is parallel to the plane 16 and that no dragging effect to the forward travel of the airplane is caused by the lifting planes 59 when they are in lifting position. This arrangement permits the efficient use of simultaneous forward travel and lifting effort in various degress. It will also be noticed that I provide a plurality of successive lifting planes within the airstream, each successive plane being at a greater inclination from the horizontal than the preceding one, this arrangement giving a maximum amount of lift from the deflected air. The propeller 22 may be disconnected by a clutch and an additional clutch may also be inserted in the shaft 54 between the bevel gear 55 and the motor, this giving the operator more flexible control.

Figure 8:
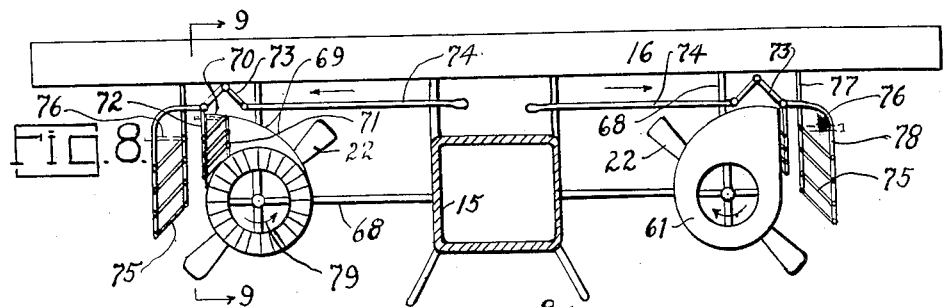
Fig. 8 shows a rear sectional view on the line 8—8 of Fig. 9 showing still another arrangement for causing an airplane to rise directly from the ground.
Figure 9:
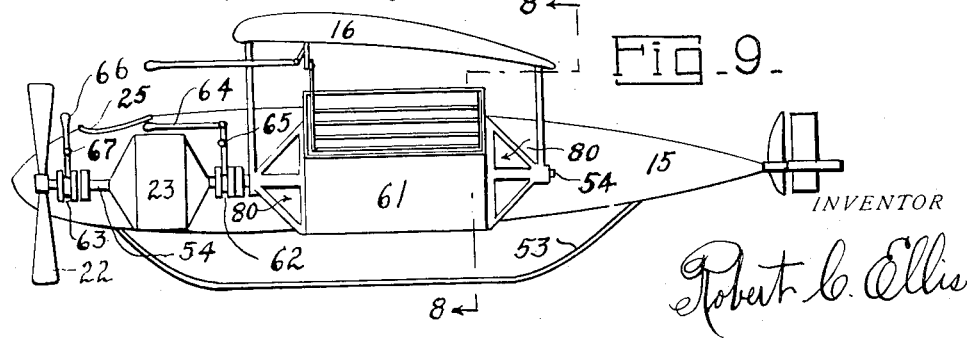
Fig. 9 is a sectional view on the line 9—9 of Fig. 8.

Figs. 8 and 9 show rear and side sectional views respectively of a still different arrangement of accomplishing the same result as in the previously described mechanisms, namely, hovering over any desired spot or taking off or alighting from and to the ground without any forward movement of the airplane. In this particular case I utilize a fan-blower instead of the conventional propeller, the fan-blower being capable of propelling air through a much greater resistance. The usual propeller 22 is operated by the motor 23, this motor also serving to operate the fan-blower 61, this apparatus being preferably mounted to the same motor shaft, there being however a clutch 62 mounted between the motor and the fan-blower and an additional clutch 63 mounted between the motor and the propeller 22 so that either one or both the propeller and fan-blower may be operated by the motor 23. The clutch 62 is operated from the pilot seat 25 by means of the arm 64 which is pivoted at 65 while the clutch 63 is operated by the arm 66 which is pivoted at 67. The fan-blower 61 is here shown attached to the fuselage 15 and the wing 16 by means of the struts 68 but any other satisfactory mounting may be employed. It will be noted that the fan-blower 61 is mounted in an inverted position so that advantage is taken of the upward thrust of the impelled air against the under concave side of the fan-blower casing at the place marked 69.

Within the exit of the fan-blower casing is mounted a series of deflectors, normally in horizontal position as at 70 but capable of being inclined on their pivoted mounting 71 as shown in the drawings by means of the vertical rod 72 which is operated by the bell crank lever 73 to which in turn is pivoted the operating rod 74. Supplementing the deflecting vanes 70 are mounted additional vanes 75, being also normally horizontal as indicated by the dotted lines 76. The standard 77 supports these supplementary vanes and they are operated by the vertical rod 78 which is also connected to and operated by the bell crank 73 and operating rod 74. Assuming that the fan revolves in the direction of the arrow 79, this causing air to be impelled with great velocity and force through the exit of the fan-blower casing, an upward thrust or lift is at first produced against the underside of the enlarged fan-blower air exit at the concave portion 69; next an upward thrust to the airplane is given by means of the deflected air when impelled against the deflectors 70; while an additional upward thrust is given the airplane when the still rapidly traveling air-stream strikes the deflectors 75. The air enters the fan-blower 61 through the apertures indicated by the arrows 80. It will thus be seen that an airplane of this particular type will be capable of rising directly upwards from the ground and, after the desired height has been reached, the pilot merely disconnects the fan-blower 61 by means of the operating rod 64, incidentally connecting the propeller 22 by means of the clutch 63 and operating rod 66, the airplane then travelling forward at rapid speed. When the proper destination has been arrived at, the pilot again starts the fan-blower 61 in operation and releases the propeller 22 from the motor permitting the airplane to gradually lower either by operating the rod 74, controlling the degree of inclination of the deflecting vanes, or by reducing the speed of the engine to an appropriate degree corresponding to the desired speed of descent.

From the foregoing description it will be apparent that I have evolved an entirely new application of aerial dynamics in regard to aerial transportation. It is known to me that many previous attempts have been made to rise straight upward from the ground, or nearly so, but these applications have mostly been directly on the free air by means of propellers; the fault of same being that a small high speed propeller would merely churn a hole in the air strata without giving much lifting effort, while with the use of a larger slow speed propeller, the extra weight and size required would make it prohibited for airplane use. It will be noted that I use a small high speed propeller directing a powerful air-stream from a substantially horizontal direction on a deflecting surface, attached to the plane itself, of a sufficiently large area to utilize for lifting purpose the full power imparted to the propeller or fan-blower. With the above described application, there is no lifting reaction on the free air itself or the medium through which the airplane travels, but the entire lifting effort is contained within the airplane itself the mechanism transferring high velocity air from the horizontal, (which has no vertical reaction), to downwards with a resultant efficient upward reaction through use of deflecting vanes. Incidentally, it will be apparent that, should vertical ascension only be desired, the planes or wings 16 and 17 may either be dispensed with entirely or greatly diminished in size. In fact, I am well aware of the fact that airplanes as at present constructed, could sustain themselves in flight with less wing surface, the superfluous wing surface now being necessary on account of the safety required in landing and also the requirements in taking off. With my self-contained lifting apparatus attached to an airplane, these objections are eliminated, the wing surface can be reduced and greater speed will result. In fact the airplane could be operated without wings by causing both the propeller and the lifting mechanism to operate simultaneously.

Having thus described my invention, what I claim is:

1. An airplane comprising a fuselage, a sustaining plane mounted thereon, a frame mounted on each side of the fuselage and the plane, a motor mounted in each frame, a tractive propeller attached to the forward end of the motor shaft, a fan-blower attached to the rear-ward end of the motor shaft, a clutch between the motor and the propeller, an additional clutch between the motor and the fan-blowers, and lifting vanes mounted within the fan blower casing.

2. An airplane comprising a fuselage, a sustaining plane mounted thereon, a frame mounted on each side of the fuselage and the plane, a motor mounted in each frame, a tractive propeller attached to the forward end of the motor shaft, a fan blower attached to the rearward end of the shaft, a clutch between the motor and the propeller, an additional clutch between the motor and the fan blower, lifting vanes mounted within the fan-blower casing, and additional lifting vanes mounted within the air-stream outside of the fan-blower casing.

3. An airplane comprising a fuselage, a sustaining plane mounted thereon, a frame mounted on each side of the fuselage and the plane, a motor mounted in each frame, a tractive propeller attached to the forward end of the motor shaft, a fan-blower attached to the rearward end of the shaft, a clutch between the motor and the propeller, an additional clutch between the motor and the fan blower, lifting vanes mounted within the fan blower casing, additional lifting vanes mounted within the air-stream outside of the fan-blower casing, and means for adjusting the degree of inclination of said lifting vanes.

4. An airplane comprising a fuselage, a frame mounted to the fuselage, a motor mounted to the frame, a centrifugal blower attached to the motor-shaft and a series of superimposed lifting vanes mounted within the blower exhaust casing.

5. An airplane comprising a fuselage, a frame mounted to the fuselage, a motor mounted to the frame, a centrifugal blower attached to the motor-shaft and a series of superimposed adjustable lifting vanes mounted within the blower exhaust casing.

6. An airplane comprising a fuselage, a frame mounted to the fuselage, a motor mounted to the frame, means connected to the motor for creating air pressure, means for confining said air under pressure within a restricted passage, and a series of superimposed lifting vanes mounted within said passage.

7. An airplane comprising a fuselage, a motor mounted thereto, a tractive propeller attached to said motor-shaft a centrifugal blower also mounted to the said shaft, a clutch between said motor and propeller, a clutch between said motor and centrifugal blower, and a series of superimposed lifting vanes adjustably mounted in the exhaust of said blower.

8. An airplane comprising a fuselage, a motor mounted thereto, a propeller attached to and operable by the motor, a centrifugal blower attached to and operable by said motor, means for attaching and detaching said propeller to said motor, means for attaching and detaching said centrifugal blower to said motor, and lifting vanes mounted within the exhaust passage of said centrifugal blower.

Signed at Bronx Borough, in the county of Bronx and State of New York, this 29th day of January A. D., 1932.

ROBERT C. ELLIS.